United States Patent [19]
Sullivan et al.

[11] Patent Number: 4,739,344
[45] Date of Patent: Apr. 19, 1988

[54] CHART RECORDED HAVING MULTIPLE THERMAL PRINT HEADS

[75] Inventors: Michael J. Sullivan, Portsmouth; David M. Gaskill, Providence; Albert W. Ondis, North Kingstown, all of R.I.

[73] Assignee: Astro-Med, Inc., West Warwick, R.I.

[21] Appl. No.: 19,680

[22] Filed: Feb. 27, 1987

[51] Int. Cl.[4] .......................................... G01D 115/00
[52] U.S. Cl. ............................ 346/76 PH; 346/139 R
[58] Field of Search ................ 346/76 PH, 49, 139 R, 346/139 C, 155; 400/120, 16, 21, 65, 67; 364/518, 514

[56] References Cited

FOREIGN PATENT DOCUMENTS 55-156080 12/1980 Japan .............................. 346/76 PH Primary Examiner—Arthur G. Evans
Attorney, Agent, or Firm—Salter & Michaelson

[57] ABSTRACT

A chart recorder includes a chart drive assembly including a drive platen, first and second print heads, a slave controller for energizing the second print head, a master controller for energizing the first print head and for actuating the slave controller and a host computer for controlling the master and slave controllers and for supplying data thereto. The master controller controls the chart drive assembly to coordinate it with the energizations of the print heads, and it actuates the slave controller to synchronize the energizations of the print heads. The print heads are independently mounted in end-to-end relation and independently biased toward the chart and the platen at a printing station to enable them to compensate for deflections in the print head and/or the platen, as well as distortions in the heads due to thermal expansion.

29 Claims, 7 Drawing Sheets

CHART RECORDED HAVING MULTIPLE THERMAL PRINT HEADS

BACKGROUND AND SUMMARY OF THE INVENTION

The instant invention relates to data recording apparatus and more particularly to a chart recorder of the general type which is operative for thermally printing images on a thermally responsive chart to record data thereon.

Chart recorders of the general type which include thermal print heads for printing images on thermally sensitive charts are well known in the chart recorder industry. Typically, a chart recorder of this general type comprises a rotating platen for longitudinally advancing a continuous thermally sensitive chart to a printing station, a thermal print head which engages the chart at the printing station, and means for receiving input signals and for selectively energizing the thermal print head to produce markings on the chart which correspond to the input signals. The thermal print head of a chart recorder of this type generally includes a ceramic substrate and a large number of closely spaced dots or thermal elements on the substrate which are individually selectively energizable to produce markings on a chart. Further, the thermal elements of a print head of this type are generally disposed in a predetermined linear array having a relatively high dot density of approximately eight dots per millimeter or more so that the print head can be utilized for producing wave forms and/or other images and characters having relatively high degress of resolution and clarity. It has been found that recorders of this general type can be operated at relatively high printing frequencies for producing continuous wave-form images; and since they do not require the use of moving parts, such as pens or styli, for producing images they are generally less prone to wear than other types of recorders. Further, it has been found that recorders of this general type are extremely versatile and are adaptable for use in a wide variety of applications. It has also been found that they are capable of simultaneously producing various wave-form images along with various annotations and/or graphics, and that they are capable of simultaneously recording a plurality of different wave-form images on different segments of a single chart.

It has been found that for certain applications, such as in the medical and aerospace fields, it can be important for a chart recorder to be capable of simultaneously recording wave-form images from eight or more different signal channels on single charts. However, for practical reasons, most of the heretofore available thermal print head-type chart recorders have been limited to maximum printing widths of approximately 12 in.; and hence in order to adapt them to accommodate large numbers of channels, it has been necessary to overlap the wave-form images of adjacent channels or to reduce the amplitudes of the images. Both of these techniques have been found to be unsatisfactory in many cases; and hence, a need has developed for an effective thermal print head-type recorder which has a printing width of greater than approximately 12 in.

One reason that the heretofore available chart recorders of the above-described type have been limited to maximum printing widths of approximately 12 in. is that reliable thermal print heads having lengths of greater than approximately 12 in. have simply not been available at economically feasible prices. For example, while thermal print heads having lengths of up to 16 in. have been heretofore available, they have been found to cost up to ten times as much as thermal print heads having lengths of approximately 8 in. Further, it has been found that thermal print heads having lengths of greater than approximately 12 in. are often relatively unreliable and require relatively expensive high capacity energizing circuitry.

It has been also found that print heads having lengths of greater than approximately 12 in. tend to cause certain mechanical difficulties in chart recorders. Specifically, it has been found that when the lengths of a thermal print head and a platen associated therewith are increased beyond approximately 12 in., deflections in the print head and the platen due to gravity, and deflections in the print head due to thermal expansion make it extremely difficult to maintain the print head in uniformly pressurized engagement with a chart over the entire width of the chart at a printing station. As a result, it has been found that it can be extremely difficult to maintain a uniform printing quality throughout the entire width of a relatively wide chart. It has also been found that variations in pressure between a print head and a chart over the width of a relatively wide chart can make it difficult to uniformly and evenly advance the chart through a recorder. In fact, it has been found that it is generally necessary to increase the amount of printing pressure which is applied to a print head by approximately 50% in order to maintain uniform printing quality and uniform chart advancement when the length of the print head is increased beyond approximately 12 in. Unfortunately, however, it has also been found that when the printing pressure which is applied to a print head is increased in this manner, the tendency of the print head to wear due to abrasion is also increased significantly so that the overall effective life of the print head is drastically reduced.

The instant invention provides a novel chart recorder which can be effectively embodied with increased printing widths, i.e., printing widths of greater than approximately 12 in. Specifically, the instant invention provides a chart recorder which includes a plurality of print heads which are mounted in end-to-end relation in a unique mounting assembly and which are electrically energizable through unique control circuitry to enable them to effectively provide a combined printing width of greater than approximately 12 in. More specifically, the chart recorder of the instant invention includes means for longitudinally advancing an elongated thermally responsive chart to a printing station and for engaging one side of the chart to support it at the printing station. The recorder further comprises first and second thermal print heads and means for mounting the thermal print heads so that they are disposed in pressurized engagement with the chart and in substantially transverse relation therewith at the printing station. The chart recorder further includes energizing means for receiving input signals and for selectively energizing the print heads to produce markings on the chart which correspond to the input signals. The energizing means is preferably operable for simultaneously selectively energizing the print heads in parallel relation with each other and preferably comprises a slave controller which is actuatable for energizing the second print head, a master controller which is operable for energizing the first print head and for simultaneously actuating the slave controller to energize the second print head, and a host computer for controlling the master and slave controllers and for supplying command signals and data signals thereto. The host computer is preferably operable for receiving and processing the input data signals and the command signals and for supplying digitally encoded signals derived therefrom to the master controller and the slave controller. Further, the master controller preferably includes means for producing a clock signal, and it is preferably operable for energizing the first print head and for actuating the slave controller to energize the second print head at times which are synchronized with the clock signal so that the energization of the first print head is synchronized with the energization of the second print head. In addition, the means for advancing the chart is preferably operative in response to the clock signal from the master controller for advancing the chart in stepped increments which are coordinated with the energizations of the first and second print heads. The chart recorder preferably further comprises chart sensor means for sensing one or more chart conditions, such as "top of form", etc., and the master controller is preferably responsive to the chart sensor means for controlling the operation of the first print head and for controlling the slave controller to control the operation of the second print head. The means for mounting the print heads in the chart recorder of the instant invention is preferably operative for independently mounting the print heads so that they are independently movable toward the chart, and it includes means for independently biasing the first and second print heads toward the chart. The means for advancing the chart preferably comprises a rotating cylindrical platen which extends substantially transversely across the chart at the printing station for advancing and supporting the chart at the printing station, and the biasing means is preferably operative for biasing the print heads toward the platen of the printing station where the chart is received between the print heads and the platen.

It has been found that the chart recorder of the subject invention effectively overcomes the difficulties which have been encountered in the previous attempts to increase the printing widths of thermal print head-type chart recorders beyond approximately 12 in. More specifically, by constructing the chart recorder of the instant invention so that it includes a plurality of print heads instead of one long print head, it is possible to substantially reduce the overall cost of the recorder. Further, by utilizing relatively short print heads, such as those of approximately 8 in. in length, the chart recorder of the subject invention has a substantially higher degree of reliability than a recorder having one long print head, such as one of 16 in. in length. In addition, in the event of a malfunction, it is substantially less costly to replace one relatively inexpensive 8 in. print head instead of an expensive 16 in. print head. Further, by utilizing two print heads which are energized through parallel energization circuitry instead of one long print head which is energized through singular energization circuitry, it is possible to double the frequency of energization of the print heads while significantly reducing the overall size and cost of the energization circuitry. Still further, by utilizing two print heads which are independently mounted and independently biased toward a chart, it is possible to effectively compensate for deflections in the print heads and the platen associated therewith without the use of excessive printing pressures.

Accordingly, it is a primary object of the instant invention to provide a reliable, economically feasible and practical chart recorder which is operative for thermally printing images on charts over printing widths of greater than approximately 12 in.

Another object of the instant invention is to provide an effective chart recorder comprising multiple thermal print heads.

An even further object of the instant invention is to provide a mounting assembly which can be effectively utilized for mounting a plurality of thermal print heads in a chart recorder.

An even further object of the instant invention is to provide a chart recorder comprising a plurality of thermal print heads which are energized through parallel circuitry.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
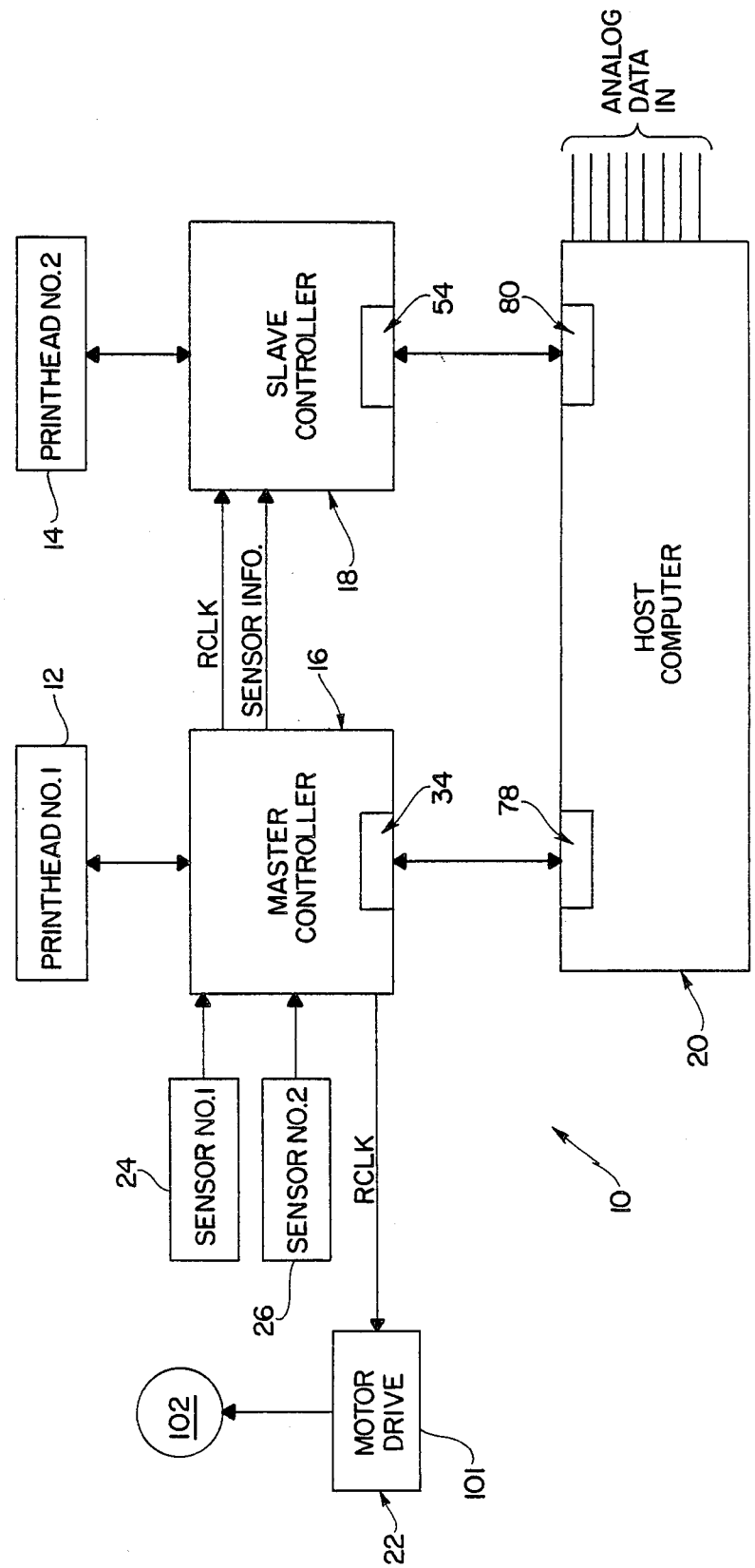
FIG. 1 is a block diagram of the recorder of the instant invention.
Figure 5:
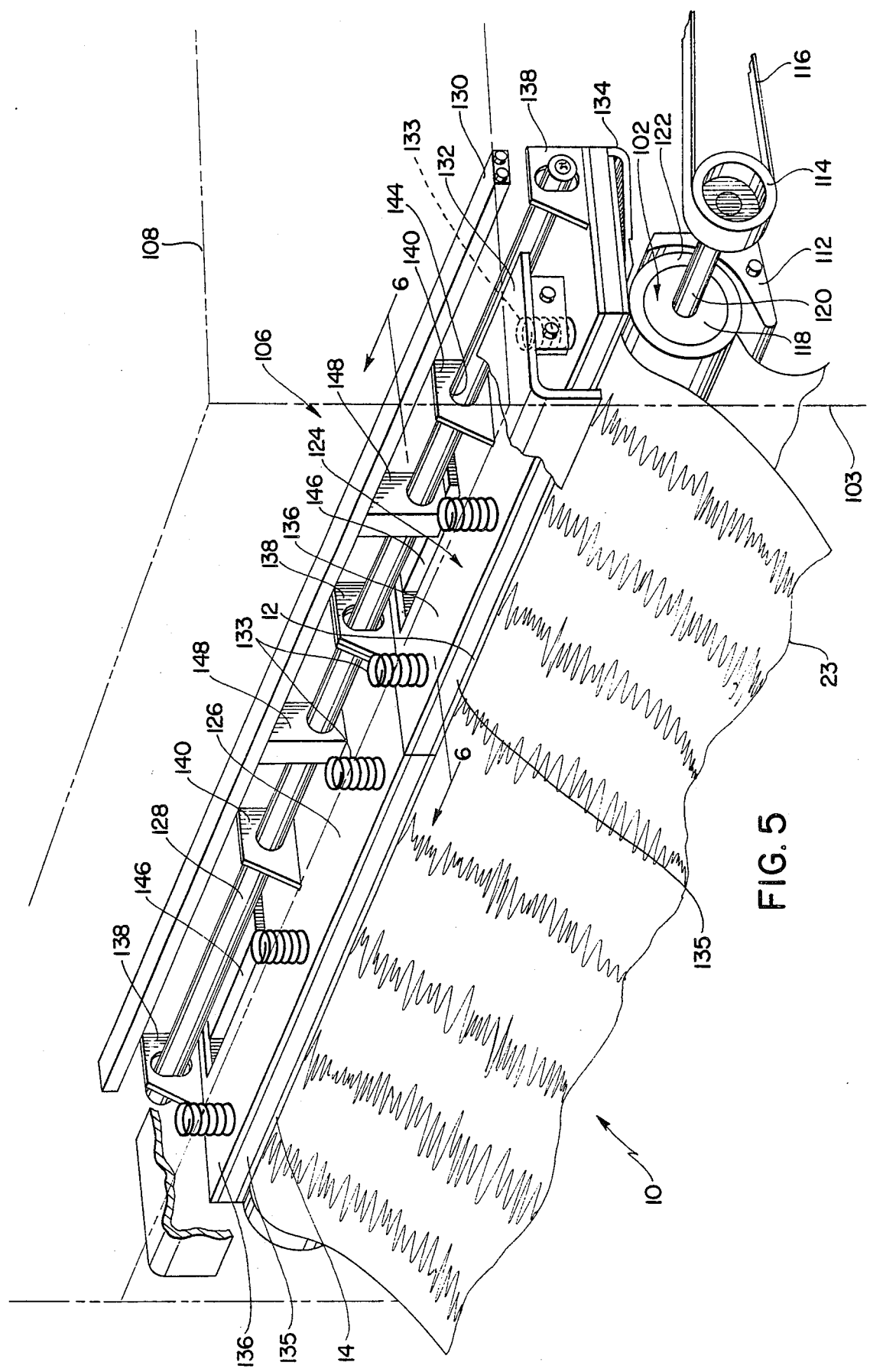
FIG. 5 is a perspective view of the printing assembly of the recorder.
Figure 6:
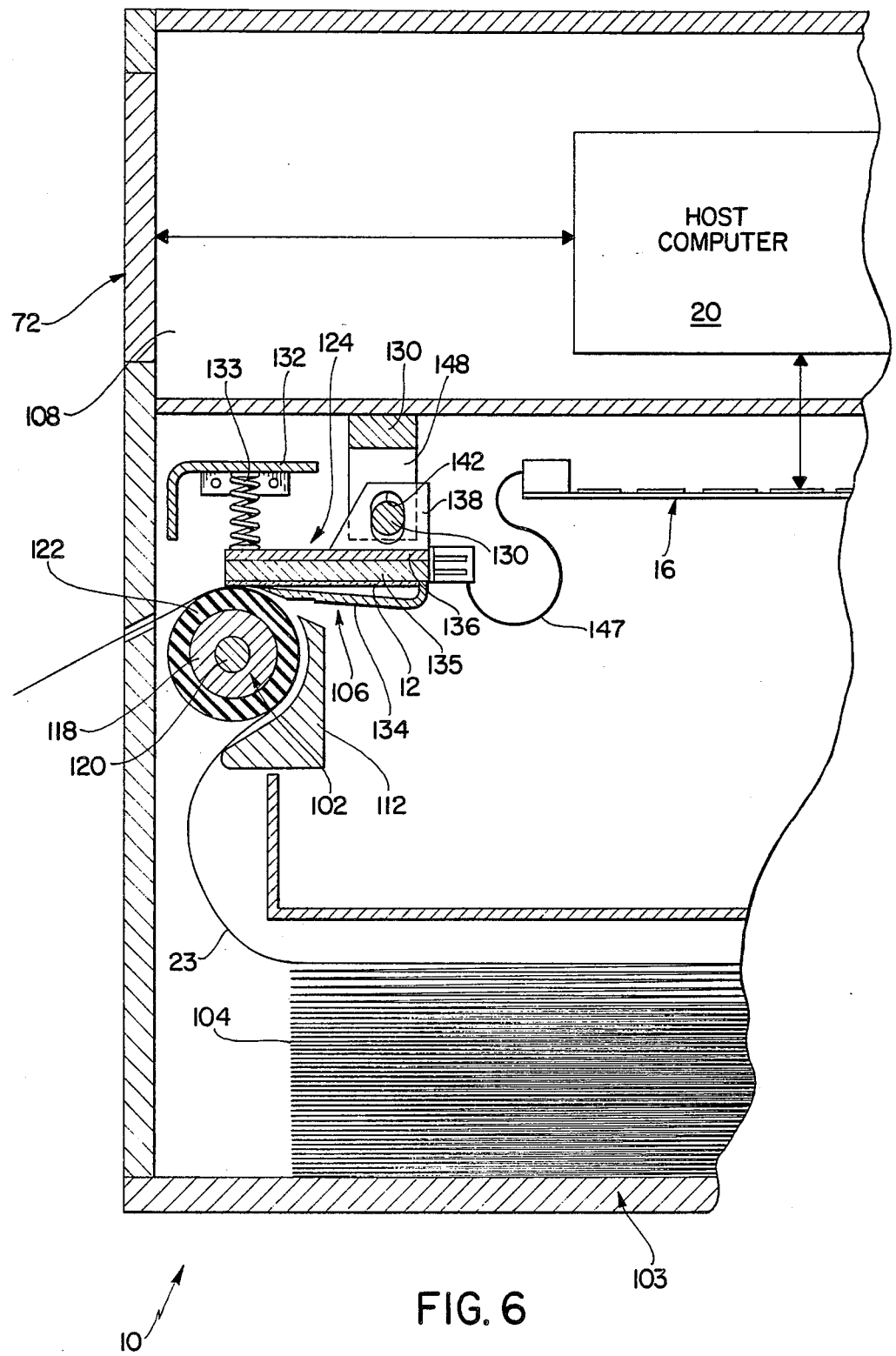
FIG. 6 is a side elevational view of the recorder with portions of the housing and chassis broken away.

Referring now to the drawings, the recorder of the instant invention is illustrated and generally indicated at 10 in FIGS. 1, 5 and 6, and it comprises first and second thermal print heads 12 and 14, respectively, a master controller generally indicated at 16, a slave controller generally indicated at 18, a host computer generally indicated at 20, a chart drive assembly generally indicated at 22 including a thermally responsive chart 23, and first and second chart sensors 24 and 26, respectively. During operation of the recorder 10, the host computer 20 is operative for receiving input data signals from various data sources and for processing the input data signals and supplying them to the master controller 16 and the slave controller 18; and the host computer 20 is also operative for receiving various operator command signals and for controlling the operation of the master controller 16 and the slave controller 18 in response thereto. The master controller 16 is operative for controlling the energization of the first print head 12, and it is also operative for actuating the slave controller 18 to energize the second print head 14 and for controlling the operation of the drive assembly 22. The master controller 16 is also responsive to the chart sensors 24 and 26 for controlling the energization of the first print head 12 and for controlling the slave controller 18 to control the energization of the second print head 14. The recorder 10 as herein embodied is adapted for receiving 8 analog input signals, and the first and second print heads 12 and 14 preferably have lengths of approximately 8 in. each, and they are operative for producing images which correspond to the input signals and/or alpha numeric annotations associated therewith on a thermally responsive chart having a width of approximately 16 in. It will be understood, however, that other embodiments of the recorder of the instant invention which are adapted for receiving other quantities of input signals and/or which include print heads of different lengths or additional print heads and slave controllers are contemplated.

The print heads 12 and 14 are preferably conventional thermal print heads, each comprising a ceramic substrate and a plurality of discrete thermal elements which are disposed in a predetermined array and which are individually selectively energizable for producing markings on the thermally responsive chart 23. The print heads 12 and 14 are preferably operable with two levels of data storage, and they are preferably adapted for use in combination with conventional latching circuitry. In this regard, it has been found that thermal print heads of the general types disclosed in the U.S. patents to BROOKS et al, U.S. Pat. No. 4,595,935, and ANNO et al, U.S. Pat. No. 4,369,452, can be effectively utilized for the print heads 12 and 14; although it will be understood that the use of a variety of other conventional thermal print heads is contemplated. The print heads 12 and 14 preferably have individual lengths of approximately 8 in. since print heads of this size are readily available due to the wide use of such print heads for facimile machines for the Japanese market. Further, by combining two 8 in. print heads, it is possible to construct a recorder having a combined or total print head length of approximately 16 in. which is dimensioned to be received in a conventional standardized 19 in. instrument panel or rack having standardized panel openings of approximately 17¼ in. In addition, by utilizing two 8 in. print heads to provide a combined print head length in the recorder 10 of approximately 16 in., it is possible to operate the recorder 10 with eight data channels so that eight distinct images are produced on eight separate side-by-side 40 millimeter wide segments of a chart having an overall width of approximately 16 in. In this regard, it should be noted that the print heads 12 and 14 inherently have inoperative border areas adjacent the opposite ends thereof so that there is inherently an inoperative or nonprinting area adjacent the center of the chart where the heads 12 and 14 meet. The wave-form images produced by the recorder 10 are preferably oriented on either side of this central nonprinting area to avoid interruptions in the images produced; but since the central nonprinting area is normally relatively narrow, it generally does not detract significantly from the effectiveness of the recorder 10.

Figure 2:
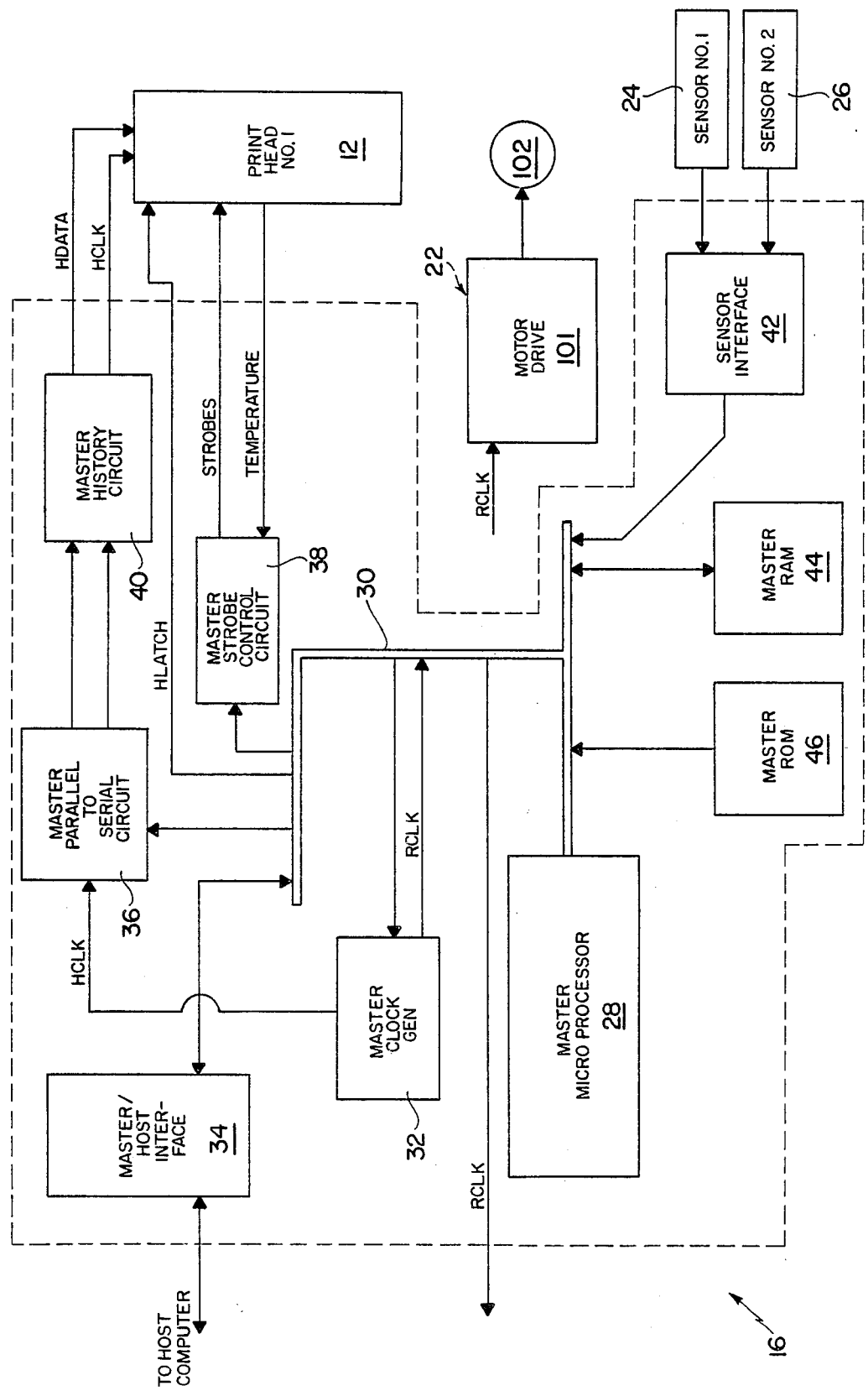
FIG. 2 is a block diagram of the master controller of the recorder.

The master controller 16 is illustrated most clearly in FIG. 2, and it preferably comprises a controller of the type embodied in the Astrograph Series Model AG-857 OEM Digital Recorder Printer currently manufactured by Astro-Med, Inc. of West Warwick, Rhode Island. More specifically, the master controller 16 preferably comprises a microprocessor 28 having a buss 30, a clock generator 32, a master/host interface 34, a parallel-to-serial circuit 36, a strobe control circuit 38, and a history circuit 40. The master controller 16 preferably further comprises a sensor interface circuit 42, a RAM 44, and a ROM 46. The microprocessor 28 preferably comprises a 16 bit microprocessor such as an 80186 microprocessor manufactured by Intel Corporation of Santa Clara, Calif., and it is programmable with conventional programming techniques so that it is operative for producing address, data and control signals through the buss 30. The clock generator 32 preferably comprises a clock pulse generator, such as an 8254 unit manufactured by the Intel Corporation, and it is operative for producing a reference clock signal RCLK and a history clock signal HCLK. The clock generator 32 is connected to the buss 30 and it is controlled by the microprocessor 28. The RCLK signals produced by the clock generator 32 are utilized to actuate the master controller 16 and the slave controller 18 for energizing the print heads 12 and 14, respectively; and the RCLK signals are also utilized to actuate the motor drive circuit 22, as will hereinafter be more fully set forth. The master/host interface 34 is illustrated most clearly in FIG. 4, and will hereinafter be set forth in detail in connection with a corresponding interface in the host computer 20. The master parallel-to-serial circuit 36 preferably comprises a 74165 unit of the type manufactured by Texas Instruments, Inc. of Dallas, Tex. The parallel-to-serial circuit 36 is connected to the buss 30, and it is operative for receiving parallel data signals from the microprocessor 28, and for converting them to a single series signal. The series signal from the circuit 36 is synchronized with the HCLK signal from the clock generator 32 and it is passed to the master history circuit 40 along with the HCLK signal as illustrated. The history circuit 40 preferably comprises a conventional history circuit, and it is operative for limiting the maximum temperatures which can be obtained in localized areas of the print head 12. More specifically, the history circuit 40 is operative for controlling the selective energizations of the specific print head elements on the print head 12 based on the past histories of their frequencies of energization in order to prevent over heating in frequently energized areas of the print head 12. Other known history circuits which operate by this same general principal are disclosed in the U.S. patents to INUI et al, U.S. Pat. No. 4,574,293, and MORIGUCHI et al, U.S. Pat. No. 4,607,262. In any event, the history circuit 40 is operative for supplying series HDATA signals to the print head 12 for energizing specific thermal elements thereon to provide the desired thermal printing affect without causing localized over heating in the print head 12. The print head 12 is preferably connected to the buss 30 for receiving an HLATCH signal therefrom in order to lock data into storage once a sufficient number of bytes of information have been received by the print head 12 to form a completed line of data output corresponding to one complete set of instantaneous data signals received by the recorder 10. The master strobe control circuit 38 preferably comprises a circuit of the type disclosed in the U.S. patent to SULLIVAN, U.S. Pat. No. 4,590,488, and it is operative for controlling the energization of the print head 12 so that the markings thereby produced on the chart 23 have substantially uniform darkness levels regardless of the overall temperature of the head 12. The strobe control circuit 38 is connected to the buss 30 and controlled by the microprocessor 28, and it is operative in response to temperature signals from the print head 12. In this regard, the master strobe control circuit 38 is operative for producing strobe signals for energizing the print head 12 wherein the durations of the pulses in the strobe signals are varied in order to adjust the amounts of energy which are supplied to the thermal elements of the print head 12 in order to maintain substantially uniform darkness levels in the images produced on a chart. The sensor interface circuit 42 comprises a conventional interface circuit, and it is operative for receiving signals from the sensors 24 and 26 which preferably comprise conventional infrared sensors. The sensors 24 and 26 are preferably adapted and positioned so that they are operative for sensing certain preselected chart conditions, such as "top of form" or "out of paper." The sensor interface circuit 42 is operative for amplifying the signals from the sensors 24 and 26 and for comparing the amplified signals to known values to determine the chart condition and for thereafter sending signals which are indicative of chart condition to the microprocessor 28 through the buss 30. The random access memory or RAM 44 preferably comprises two 8k byte RAM units, such as two 6264 RAM units manufactured by Intel Corporation, and it is operative in combination with the microprocessor 28 for providing random access storage for intermediate and sensed data. The read only memory or ROM 46 preferably comprises a read only memory unit such as a 27128 EPROM unit manufactured by Intel Corporation, having a 16K byte capacity, and it is operative for providing fixed data and software for the microprocessor 28.

During use and operation of the master controller 16, command and data signals are received by the microprocessor 28 from the host computer 20 through the master interface 34. The master microprocessor 28 then processes the data signals received from the host computer 20 in accordance with preprogrammed instructions provided by the ROM 46. The data signals from the microprocessor 28 which are in the form of parallel signals are passed to the parallel-to-serial circuit 36 where they are converted into a single serial signal which is processed by the history circuit 40 and passed to the print head 12. Thereafter, the microprocessor 28 is actuated in response to the RCLK signals from the clock generator 32 for operating the master strobe control circuit 38 to send energy pulses to the print head 12 in order to energize the thermal elements thereof. The sensor interface circuit 42 operates to receive signals from the sensors 24 and 26 and to compare them with known values for determining chart condition.

Figure 2A:
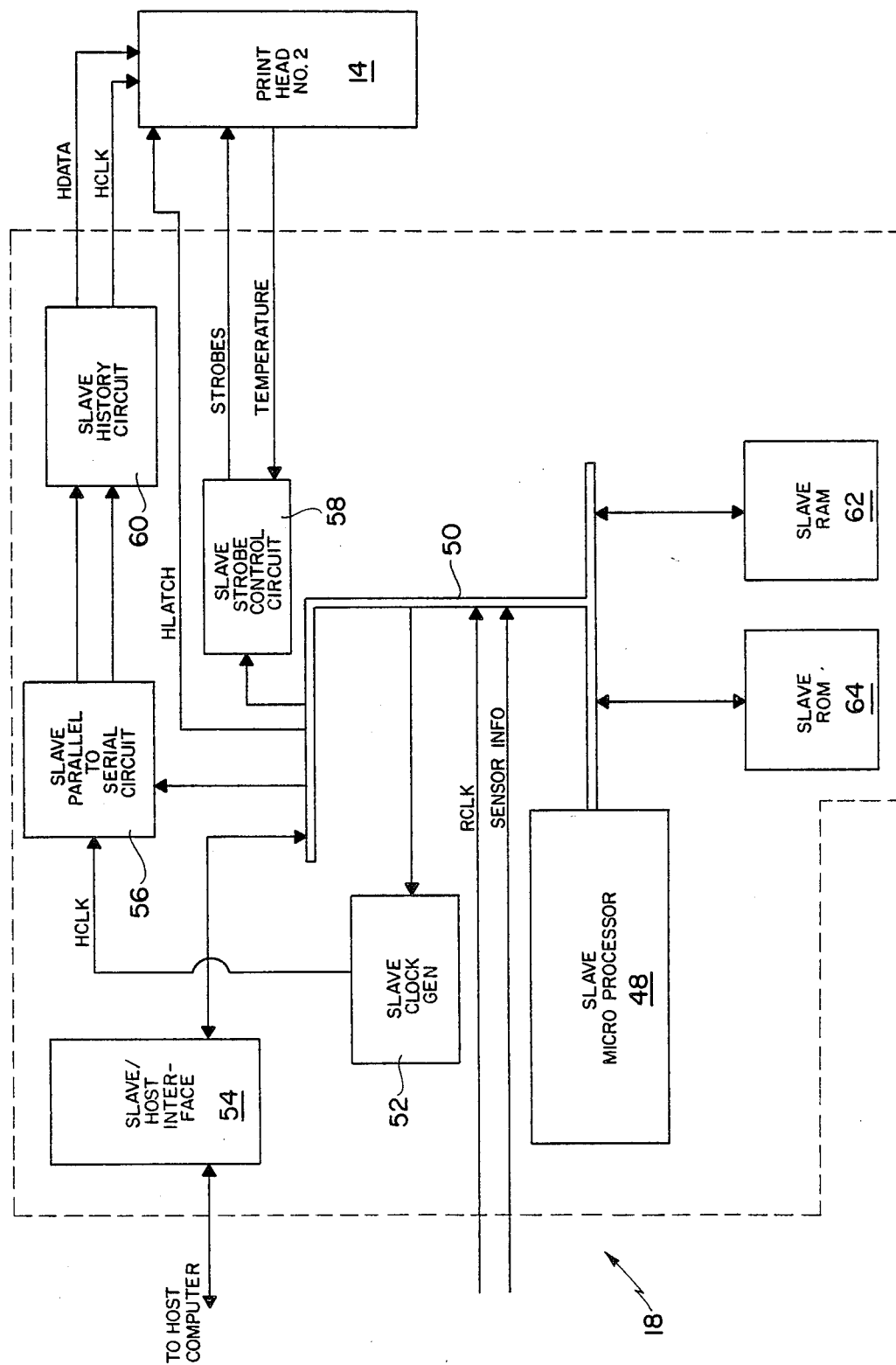
FIG. 2a is a block diagram of the slave controller of the recorder.

The slave controller 18 is illustrated most clearly in FIG. 2a, and it comprises a slave microprocessor 48 having a buss 50, a slave clock generator 52, a slave host interface 54, a parallel-to-serial circuit 56, a strobe control circuit 58, a history circuit 60, a RAM 62 and a ROM 64, all of which are preferably identical to the corresponding components in the master controller 16. However, although the slave clock generator 52 is utilized to produce an HCLK signal for the slave controller 18, it is not utilized for producing a reference clock signal, and the slave controller circuit 18 does not include a sensor interface 42. Instead, the slave controller 18 receives both RCLK signals and sensor information signals from the master controller 16, and it is operative for controlling the slave strobe circuit 58 to energize the second print head 14 in response to the RCLK signals from the master controller 16 so that the energization of the second print head 14 is synchronized with the energization of the first print head 12. The slave microprocessor 48 is responsive to the sensor information signals received from the master controller 16 for responding to certain predetermined physical conditions of the chart in the recorder 10.

Figure 3:
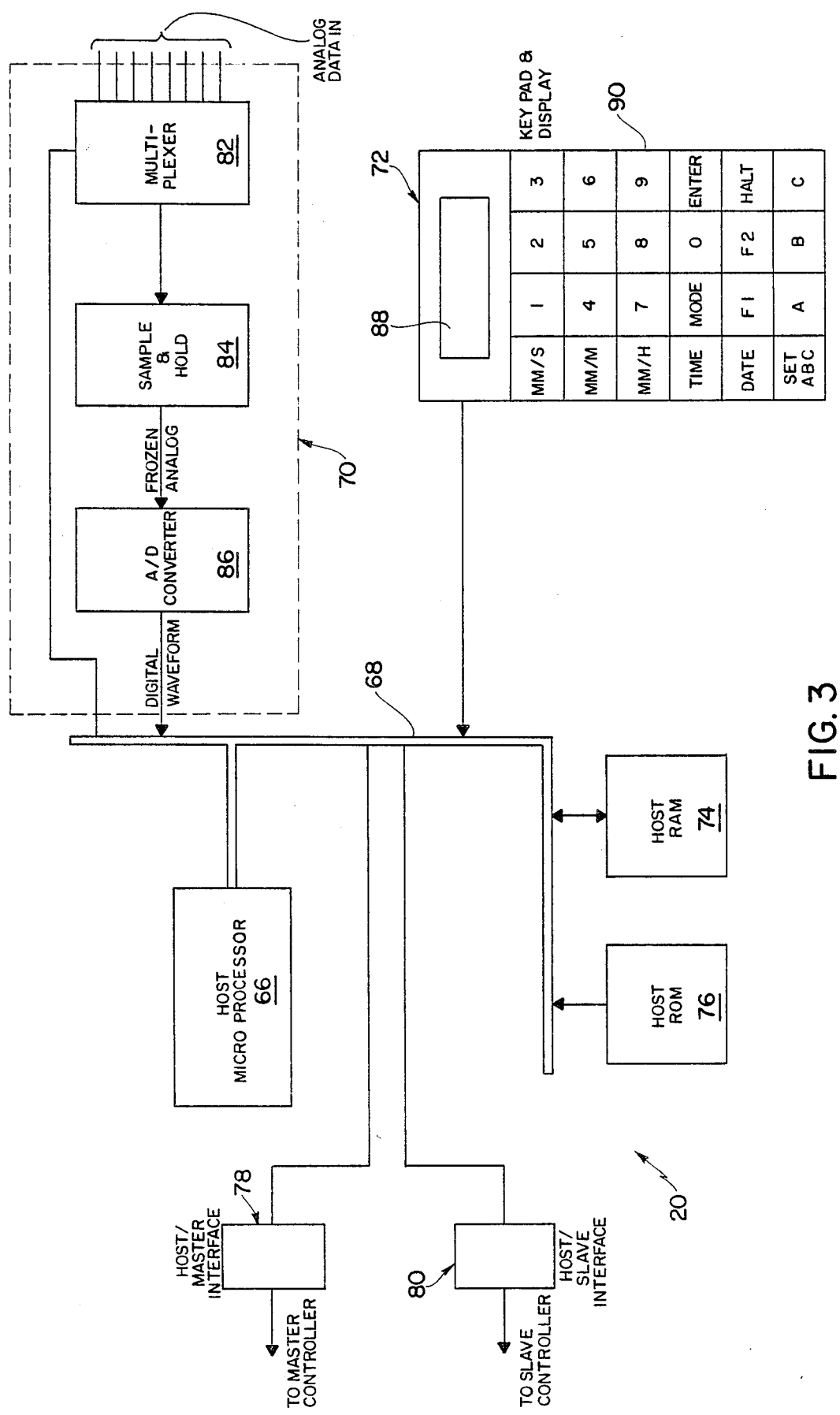
FIG. 3 is a block diagram of the host computer of the recorder.

The host computer 20 is illustrated most clearly in FIG. 3, and it comprises a microprocessor 66 having a buss 68, a data acquisition circuit 70, a user interface generally indicated at 72, a RAM 74, a ROM 76, a host/master interface circuit generally indicated at 78, and a host/slave interface circuit generally indicated at 80. The host microprocessor preferably comprises an Intel 80186 microprocessor, and the RAM 74 preferably comprises a 1 megabyte dynamic RAM array consisting of 1×128 memory devices. The ROM 76 preferably comprises two 27128 units manufactured by Intel Corporation to provide an 8K byte capacity in the ROM 76. The data acquisition circuit 70 preferably comprises a multiplexer unit 82, a sample and hold unit 84, and an analog-to-digital converter unit 86, which are connected in series to convert analog wave form signals received by the recorder 10 into digital wave form signals. More specifically, the multiplexer 82 preferably comprises an 821 Multiplexer such as as a 508 unit such as manufactured by Harris Corporation of Melbourne, Fla., and it is connected to the buss 68 for receiving actuating signals to individually pass analog signals to the sample and hold 84 in a predetermined sequence. The sample and hold 84 preferably comprises an HTC-0300 sample and hold device of the type manufactured by Analog Devices, Inc. of Norwood, Mass., and it is operative for freezing the individual analog signals from the multiplexer 82 and for feeding the frozen signals to the A/D converter 86. The A/D converter 86 preferably comprises a 12 bit converter, such as an AD5240 A/D converter manufactured by Analog Devices, Inc. The user interface 72 preferably comprises a conventional user interface unit comprising an eight character LED display such as manufactured by Hewlett-Packard Corp. of Palo Alto, Calif., and a key pad 90 which is operative for controlling the operation of the host computer 20 and for thereby controlling the operation of the recorder 10.

During use and operation of the recorder 10, the host computer 20 receives operator command signals through the user interface 72, and it samples wave form information from various data sources to which it is connected. The microprocessor 66 processes this information in accordance with preset programming provided by the ROM 76, and it utilizes the RAM 74 for storing data and/or intermediate data information. More specifically, the host 20 translates user command signals into controller commands and it sends the translated signals to the controllers 16 and 18. The host 20 translates the wave form information into digitized wave form information and passes the digitized signals to the controllers 16 and 18. The host 20 also performs various operator convenience functions, such as adjusting chart speed and readout wave form positions on the chart.

Figure 4:
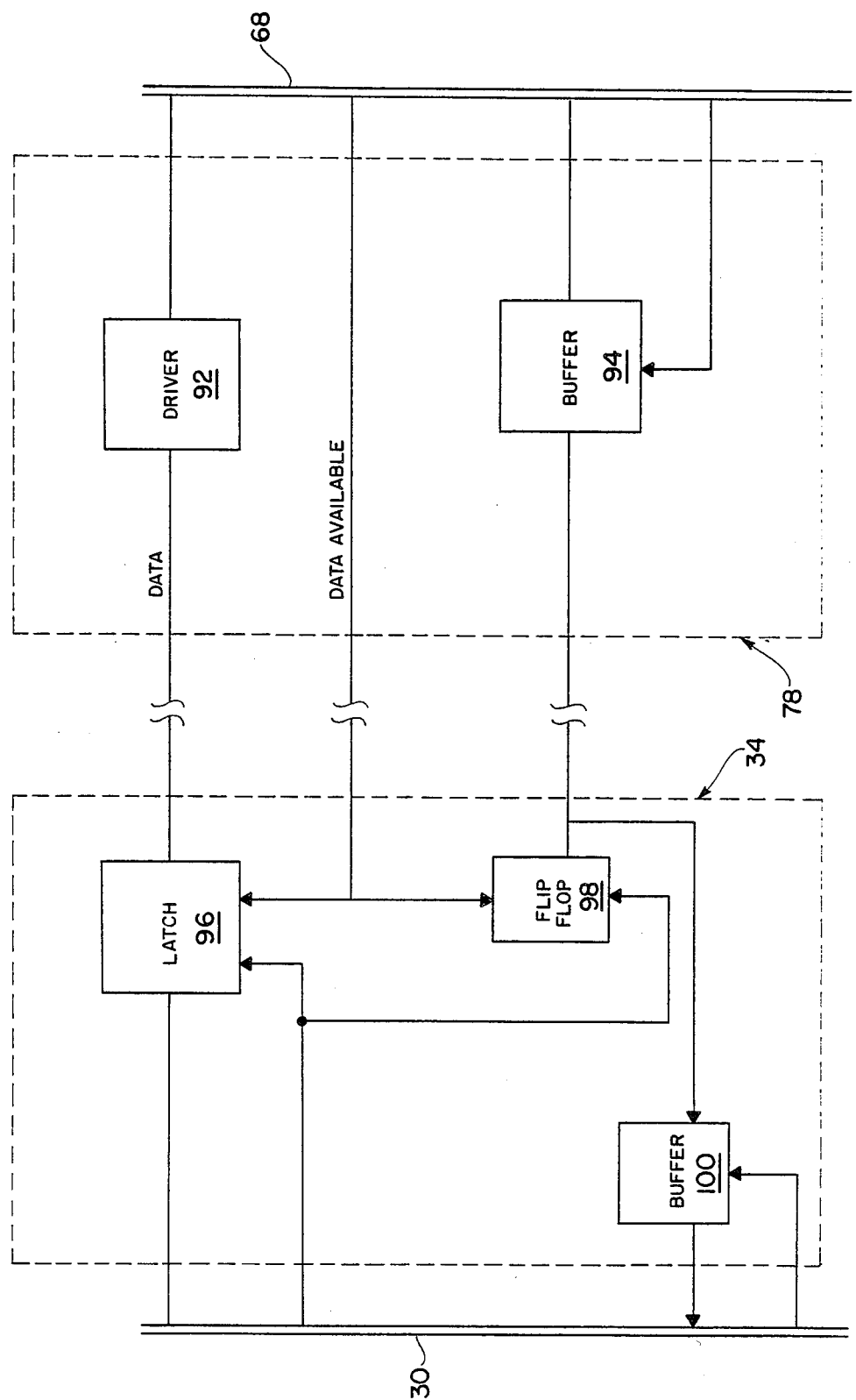
FIG. 4 is a block diagram of the interface between the host computer and the master controller.

The interface circuitry which is operative for transferring signals between the host computer 20 and the master controller 16 is illustrated in FIG. 4, and it comprises the master/host interface 34 and the host/master interface 78. The master/host interface 34 and the host/master interface 78 are operative as a conventional parallel interface circuit such as typically found on thermal print head-type recorders. The host/master interface 78 comprises a 74244 driver 92, and a tristated buffer 94, and the master/host interface 34 comprises a latch 96, a bistable multivibrator or flip-flop 98, and a buffer 100. During operation of the circuits 34 and 78, data is passed from the buss 68 of the host microprocessor 66 to the driver 92 and on to the latch 96 where it is stored until the microprocessor 28 is ready to receive the data. When the microprocessor 28 is ready, it sends a signal from the buss 30 to the latch 96 and to the flip-flop 98 which causes the "data" signals to be passed to the microprocessor 28 through the buss 30, and causes the flip-flop 98 to be changed from a "set" condition to a "reset" condition. When the flip-flop 98 is changed to a "reset" condition, the line from the flip-flop 98 to the buffer 94 is switched from a high voltage state to a low voltage state, which indicates that the latch 96 is ready to receive a new set of data. When the host microprocessor 66 is ready to read the state of the flip-flop 98 to determine whether or not the latch 96 is ready to receive a new set of data, the microprocessor 66 sends a "read buffer" signal to the buffer 94, and when a new set of data is available from the host computer microprocessor 66, the microporcessor 66 sends a "new data available" signal to the latch 96 and to the flip-flop 98. This causes the latch 96 to receive data from the microprocessor 66 through the driver 92, and it simultaneously changes the flip-flop 98 to a high voltage "set" condition which indicates that the latch 96 is "busy". The high voltage "set" condition of the flip-flop 98 can be sensed by the microprocessor 66 by sending out another read buffer signal to the buffer 94 so that the microprocessor does not send additional "data" signals to the driver 92 until the latch 96 is "ready". The flip-flop 98 is also connected to the buffer 100 for enabling the microprocessor 28 to determine whether the latch 96 is in a "busy" or "nonbusy" condition. More specifically, the microprocessor 28 is operative for sending read buffer signals to the buffer 100 to enable the microprocessor 28 to sense the voltage level of the flip-flop 98 in order to determine the condition of the latch 96.

The interface circuitry comprising the slave/master circuit 54 and the master/slave circuit 80 which is utilized for passing signals between the host computer 20 and the slave controller 18 is identical to the interface circuitry which is utilized for passing signals between the host computer 20 and the master controller 16, and hence it is not set forth in detail herein.

The chart drive assembly 22 is operative for advancing the chart 23, and it comprises a motor drive 101 which drives a platen 102. The motor drive 101 comprises a stepping motor, and it is operative in response to the RCLK signal from the master controller 16 for rotating the platen 102 to advance the chart 23 to the print heads 12 and 14 in predetermined stepped increments which are coordinated with the energizations of the print heads 12 and 14. The platen 102 is mounted in the recorder 10 so that the thermally responsive chart 23 passes in pressurized engagement between the print heads 12 and 14 and the platen 102 in a conventional manner at an area representing a printing station.

Referring now to FIGS. 5 and 6, the structural details of the recorder 10 are more clearly illustrated. As will be seen, the recorder 10 comprises a chassis 103 containing a pack 104 of continuous chart paper, the drive assembly 22, a printing assembly 106 including the print heads 12 and 14, the master controller 16 and the slave controller 18. The recorder 10 further comprises an upper housing 108 containing the host computer 20, the user interface 72 portion of the host computer 20 being mounted in the front wall of the housing 108 so that it is readily accessible to operators. During operation of the recorder 10, the chart 23 of thermally sensitive paper is fed from the continuous paper pack 104 to the printing assembly 106 by the drive assembly 22, and the host computer 20, the master controller 16 and the slave controller 18 cooperate for controlling the printing assembly 106 to thermally print images on the chart 23 which correspond to data and/or commands received by the host computer 20 as hereinabove set forth.

The drive assembly 22 which includes the motor drive 101 (not shown in FIGS. 5 and 6) and the platen 102 further includes a paper guide 112, a drive pulley 114, and a drive belt 116. The guide 112 is secured at opposite ends thereof to the chassis 103, and it is positioned and configured so that it extends along the lower inner side of the platen 102 for guiding the chart 23 over the platen 102. The platen 102 preferably comprises a cylindrical steel core 118 having axial shafts 120 which extend from opposite ends thereof, and an outer casing 122 which is made from a rubber-like elastomer, such as urethane. The shafts 120 are journalled in bearings (not shown) mounted on the chassis 103, and the pulley 114 is mounted on one of the shafts 120 on the exterior of the chassis 103. The drive belt 116 extends over the pulley 114 for rotating the platen 102 with the motor drive 101 (not shown in FIG. 6).

The printing assembly 106 is illustrated in FIGS. 5 and 6, and it comprises first and second print head assemblies 124 and 126, respectively, a pivot rod 128, a support bar 130, a biasing bracket 132, and a plurality of coil springs 133. The print head assembly 124 comprises the print head 12 which as a guard 134 and which is bonded to a metallic heat sink 135, and the heat sink 135 is mounted on a mounting bracket 136 having upwardly extending end tabs 138 adjacent opposite ends thereof, and an upwardly extending center tab 140. The end tabs 138 have apertures 142 therein which are elongated in a vertical direction and which are dimensioned for rotatably and movably receiving the pivot rod 128 therethrough, and the center tab 140 has a substantially circular aperture 144 therein which is dimensioned for rotatably receiving the rod 128 therethrough. Also included in the head assembly 124 is a connector housing 146 through which the print head 12 is electrically connected to the master controller 16 via a cable 147. The second print head assembly 126 is essentially identical to the print head assembly 124, and it includes a heat sink 135, a mounting bracket 136 having mounting tabs 138 and 140, and a connector housing 146, although it includes the second print head 14 instead of the first print head 12. The support bar 130 is secured at opposite ends thereof to the chassis 103, and a pair of apertured support arms 148 extend downwardly from the bar 130 for receiving and supporting the pivot rod 128. The print head assemblies 124 and 126 are mounted in the recorder 10 so that they are independently rotatably suspended from the pivot rod 128; and since the apertures 142 in the end tabs 138 are of elongated configuration, the print head assemblies 124 are independently slightly pivotable about substantially rearwardly extending horizontal axes which are substantially perpendicular to the axis of the pivot rod 128 and pass through the center tabs 140. Further, since the print head assemblies 124 and 126 are rotatably mounted on the rod 128, they are independently movable toward and away from the chart 23; and during operation of the recorder 10 the print head assemblies 124 and 126 engage the chart 23 as it passes over the platen 102. The biasing bracket 132 comprises an elongated angle bracket which is secured at opposite ends thereof to opposite sides of the chassis 103, and it is positioned so that it extends across the front portion of the recorder 10 in upwardly spaced relation to the head assemblies 124 and 126. The springs 133 are compressed between the bracket 132 and the head assemblies 124 and 126, and each of the springs 133 is operative for applying a downward pressure of approximately two pounds to its respective head assembly 124 or 126 to maintain the heads 12 and 14 in biased engagement with the chart 23. The head assembly 106 preferably comprises six springs 133, three of which are compressed between the bracket 132 and the head assembly 124 for urging the head 12 into pressurized engagement with the chart 23 and three of which engage the head assembly 126 for urging the head 14 into pressurized engagement with the chart 23.

For use and operation of the recorder 10, the host computer is connected to various data inputs, and it is operated by an operator by manipulating of the key pad 90. The host computer processes the input data and command signals from the user interface 72 and it passes processed data and command signals to the master controller and the slave controller. The master controller controls the motor drive 101 for rotating the platen 102 so that the rotation of the platen 102 is coordinated with the energizations of the heads 12 and 14, and it receives and responds to the input signals from the sensors 24 and 26. The master controller also controls the actuation of the slave controller 18 so that the energizations of the print heads 12 and 14 are synchronized with each other and coordinated with the movement of the platen 102. The print head assemblies 124 and 126 are downwardly biased by the springs 134 so that they are maintained in pressurized engagement with the chart 23, and since the print head assemblies 124 and 126 are independently movable and independently downwardly biased, they are able to compensate for surface irregularities and deflections in the print heads 12 and 14 and the platen 102.

Accordingly, it has been found that the recorder of the instant invention has several advantages over the heretofore available recorders as a result of the fact that it includes a plurality of independently mounted head assemblies which are energized through parallel controller circuits. First, by utilizing a plurality of independently mounted head assemblies, it is possible to compensate for deflections of as much as several thousands of an inch which inherently occur when thermal print head-type head assemblies are adapted to print over chart widths of greater than approximately 12. in. More specifically, it is possible to compensate for deflections without increasing head pressure. It is also possible to compensate for minor irregularities in the heads 12 and 14 and the platen 102 and to compensate for distortions due to thermal expansion in the heads 12 and 14 without increasing the head pressure. In this regard, it should be recognized that while factors such as deflection, surface irregularities, and thermal expansion are relatively insignificant with respect to head assemblies having lengths of less than 12 in., they become increasingly significant when the lengths of head assemblies are increased beyond approximately 12. in. In addition, by utilizing parallel circuitry to energize the heads 12 and 14 instead of a single high capacity circuit which would energize the heads 12 and 14 in series or a single high capacity circuit and a single elongated head, it is possible to energize the heads at frequencies which are double the frequencies which could be obtained with a single energizing circuit while actually reducing the cost of the energizing circuitry. Accordingly, for these reasons as well as the other reasons hereinabove set forth, it is seen that the recorder of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:
1. A chart recorder comprising:
 (a) advancing means for longitudinally advancing an elongated thermally responsive chart so that it passes through a printing station and for engaging one side of said chart to support it at said printing station;
 (b) a first elongated thermal print head;
 (c) a second elongated thermal print head;
 (d) means mounting said first and second print heads in substantially aligned, substantially abutting end-to-end relation with each other so that the longitudinal dimensions of said print heads are in substantially transverse relation to said chart at said printing station and so that said print heads engage said chart on the opposite side thereof from said advancing means; and
 (e) energizing means for receiving input signals and for selectively energizing said print heads to produce markings on said chart which correspond to said input signals.

2. In the chart recorder of claim 1, said energizing means simultaneously selectively energizing said print heads.

3. In the chart recorder of claim 1, said energizing means further characterized as simultaneously selectively energizing said print heads in parallel relation.

4. A chart recorder comprising:
 (a) advancing means for longitudinally advancing an elongated thermally responsive chart to a printing station and for engaging one side of said chart to support it at said printing station;
 (b) a first thermal print head;
 (c) a second thermal print head;
 (d) means mounting said first and second print heads in substantially end-to-end relation with each other and in substantially transverse relation to said chart at said printing station so that said print heads engage said chart on the opposite side thereof from said advancing means;
 (e) energizing means for receiving input signals and for selectively energizing said print heads to produce markings on said chart which correspond to said input signals, said energizing means simultaneously selectively energizing said print heads in parallel relation and comprising:
  (i) a slave controller actuatable for energizing said second print head;
  (ii) a master controller for energizing said first print head and for actuating said slave controller to energize said second print head; and (iii) host computer means for controlling the operation of said master controller and said slave controller, and for receiving input signals and supplying processed signals derived therefrom to said master controller and said slave controller.

5. In the chart recorder of claim 4, said input signals further characterized as analog wave form signals, said processed signals further characterized as digitally encoded signals.

6. In the chart recorder of claim 4, said master controller also controlling said chart advancing means.

7. In the chart recorder of claim 4, said master controller comprising means for producing a clock signal and energizing said first print head at times which are synchronized with said clock signal, said master controller actuating said slave controller for energizing said second print head at times which are synchronized with said clock signal so that the energization of said second print head is synchronized with the energization of said first print head.

8. In the chart recorder of claim 7, said chart advancing means advancing said chart in stepped increments in response to said clock signal so that the movement of said chart being coordinated with the energizations of said first and second print heads.

9. A chart recorder comprising:
(a) advancing means for longitudinally advancing an elongated thermally responsive chart to a printing station and for engaging one side of said chart to support it at said printing station;
(b) a first thermal print head;
(c) a second thermal print head;
(d) means mounting said first and second print heads in substantially end-to-end relation with each other and in substantially transverse relation to said chart at said printing station so that said print heads engage said chart on the opposite side thereof from said advancing means, said mounting means independently mounting said first and second print heads so that they are independently movable toward said chart and including means for biasing said first and second print heads toward said chart at said printing station; and
(e) energizing means for receiving input signals and for selectively energizing said print heads to produce markings on said chart which correspond to said input signals.

10. In the chart recorder of claim 9, said biasing means further characterized as independently biasing said first and second print heads toward said chart.

11. In the chart recorder of claim 10, said chart advancing means comprising a rotating cylindrical platen extending substantially transversely across the chart at said printing station for advancing said chart and supporting it at said printing station.

12. In the chart recorder of claim 1, print heads having lengths of less than approximately twelve inches.

13. In the chart recorder of claim 1, said printing heads having lengths of approximately eight inches.

14. In the chart recorder of claim 4, said mounting means further characterized as independently mounting said first and second print heads and including means for independently biasing said first and second print heads toward said chart.

15. A chart recorder comprising:
(a) advancing means for substantially continuously longitudinally advancing an elongated chart so that it passes through a printing station;
(b) thermal printing means including first and second elongated thermal print heads, means for mounting said print heads so that they are positioned in substantially aligned, substantially abutting end-to-end relation with each other with the longitudinal dimensions thereof in substantially transverse relation to said chart at said printing station and marking means thermally responsive to selective energization of said print heads for selectively producing markings on said chart; and
(c) energizing means for receiving input signals and for selectively energizing said print heads in response thereto.

16. In the chart recorder of claim 15, said energizing means comprising:
(a) a slave controller actuatable for energizing said second print head;
(b) a master controller for energizing said first print head and for actuating said slave controller to energize said second print head; and
(c) host computer means for controlling the operation of said master controller and said slave controller, and for receiving input signals and supplying processed signals derived therefrom to said master controller and said slave controller.

17. In the chart recorder of claim 16, said master controller also controlling said chart advancing means.

18. In the chart recorder of claim 16, said master controller comprising means for producing a clock signal and energizing said first print head at times which are synchronized with said clock signal, said master controller actuating said slave controller for energizing said second print head at times which are synchronized with said clock signal so that the energization of said second print head is synchronized with the energization of said first print head.

19. The chart recorder of claim 15 further comprising support means for supporting said chart at said printing station, said mounting means mounting said first and second print heads at said printing station on the opposite side of said chart from said support means so that said first and second print heads are independently movable toward said chart and said support means, said mounting means including means for biasing said first and second print heads toward said chart and said support means.

20. A chart recorder comprising:
(a) advancing means for longitudinally advancing an elongated chart so that it passes through a printing station;
(b) thermal printing means including a plurality of elongated thermal print heads, means for mounting said print heads so that the longitudinal dimensions thereof are in substantially transverse relation to said chart at said printing station and at fixed positions in the transverse extent of said chart, said print heads being disposed adjacent different longitudinally extending sections of said chart and cooperating to define a substantially continuous printing width which extends substantially across the width of said chart at said printing station and marking means thermally responsive to selective energization of said print heads for selectively producing markings on said chart; and
(c) energizing means for receiving input signals and for selectively energizing said print heads in response thereto.

21. In the chart recorder of claim 20, said energizing means comprising:
 (a) a slave controller actuatable for energizing said second print head;
 (b) a master controller for energizing said first print head and for actuating said slave controller to energize said second print head; and
 (c) host computer means for controlling the operation of said master controller and said slave controller, and for receiving input signals and supplying processed signals derived therefrom to said master controller and said slave controller.

22. In the chart recorder of claim 21, said master controller also controlling said chart advancing means.

23. In the chart recorder of claim 21, said master controller comprising means for producing a clock signal and energizing said first print head at times which are synchronized with said clock signal, said master controller actuating said slave controller for energizing said second print head at times which are synchronized with said clock signal so that the energization of said second print head is synchronized with the energization of said first print head.

24. The chart recorder of claim 20 further comprising support means for supporting said chart at said printing station, said mounting means mounting said print heads at said printing station on the opposite side of said chart from said support means so that said print heads are independently movable toward said chart and said support means, said mounting means including means for biasing said print heads toward said chart and said support means.

25. In the chart recorder of claim 20, said print heads being in substantially longitudinally aligned relation with each other.

26. A chart recorder comprising:
 (a) advancing means for longitudinally advancing an elongated thermally responsive chart so that it passes through a printing station;
 (b) thermal printing means including first and second elongated thermal print heads and means mounting said print heads so that they are positioned in substantially aligned, substantially abutting end-to-end relation with each other at said printing station and with the longitudinal dimensions thereof in substantially transverse relation to said chart, said print heads being selectively energizable for selectively producing markings on said chart at said printing station; and
 (c) energizing means for receiving input signals and for selectively energizing said print heads in response thereto.

27. In the chart recorder of claim 26, said energizing means comprising:
 (a) a slave controller actuatable for energizing said second print head;
 (b) a master controller for energizing said first print head and for actuating said slave controller to energize said second print head; and
 (c) host computer means for controlling the operation of said master controller and said slave controller, and for receiving input signals and supplying processed signals derived therefrom to said master controller and said slave controller.

28. In the chart recorder of claim 27, said master controller also controlling said chart advancing means.

29. The chart recorder of claim 26 further comprising support means for supporting said chart at said printing station, said printing means mounting said first and second print heads at said printing station on the opposite side of said chart from said support means so that said print heads are independently movable toward said chart and said support means, said mounting means including means for biasing said first and second print heads toward said chart and said support means.

* * * * *